July 3, 1934.  W. E. URSCHEL  1,964,896
BEET HARVESTER
Filed May 14, 1931   6 Sheets-Sheet 1

FIG. 1

INVENTOR
William E. Urschel
BY
ATTORNEY

July 3, 1934.   W. E. URSCHEL   1,964,896
BEET HARVESTER
Filed May 14, 1931   6 Sheets-Sheet 2

FIG. 2

INVENTOR
William E. Urschel
BY
ATTORNEY

July 3, 1934. W. E. URSCHEL 1,964,896
BEET HARVESTER
Filed May 14, 1931 6 Sheets-Sheet 3

INVENTOR
BY William E. Urschel
ATTORNEY

July 3, 1934. W. E. URSCHEL 1,964,896
BEET HARVESTER
Filed May 14, 1931 6 Sheets-Sheet 5

INVENTOR
William E. Urschel
BY
ATTORNEY

July 3, 1934. W. E. URSCHEL 1,964,896
BEET HARVESTER
Filed May 14, 1931 6 Sheets-Sheet 6

INVENTOR.
William E Urschel
BY
ATTORNEY.

Patented July 3, 1934

1,964,896

UNITED STATES PATENT OFFICE 1,964,896

BEET HARVESTER

William E. Urschel, Valparaiso, Ind.

Application May 14, 1931, Serial No. 537,410

6 Claims. (Cl. 55—108)

The prevent invention relates to a harvesting machine, and has to do with a device especially fitted for harvesting sugar beets. Its utility, however, is not in any manner limited to such crop.

The invention includes a power driven device adapted to elevate a soil-embodied crop to effect the removal of such crop from the soil, and to convey the crop into a position where it is uniformly disposed in respect to severing members, then to sever by such members the appendages and a portion of the top section from the crop.

The conveyors therein are positioned to elevate the crop to a height from which it may be discharged into a wagon traveling alongside of the apparatus, or into a suitable receptacle which may be arranged upon the harvester itself.

An abrupt pull upon the tops of beets heretofore has been a conventional manner of dislodging such a crop from the soil. Such handling, however, has resulted in many beets being left in the ground because of the snapping of the appendages without dislodging the root crop. In fact, the proportion of the crop not removed by mechanical harvesters has made many heretofore proposed devices unsuccessful.

Additionally, sugar beets are very irregular in growth. Many beets grow entirely beneath the surface of the soil, while many others project above the ground in various proportions. No accurate gauge has been devised to determine the proportion of the beet body which will be submerged beneath the soil. Some beets appear to be wholly out of the ground except for a few straggling thready roots.

In sugar beets, unlike in most other root crops, it is considered desirable to remove a top part of the body of the beet. Such removed part, which is relatively small in proportion to the body of the beet, is low in sugar content. Often, it is so tough that it is injurious to the various machines which are used in the various processes of recovering the beet juice for the purpose of the production of sugar.

The present invention provides for an efficient gathering of the beets, whether entirely submerged in the soil, or whether merely resting thereupon, and also for the removal of the leaf appendages therefrom with a portion of the top of the root which is undesirable.

Knives have heretofore been employed upon certain types of harvesters. When so employed, some of these have been mounted beneath the pulling members of the harvester. This has been one of the conventional manners in which such knives have been mounted, but none of these cutting devices have proved wholly satisfactory because the action of such knives has been more or less irregular. Some parts of crops have been hardly touched by the knives, while other parts have been completely cut away. These difficulties of irregularity of operation are rectified in the present instrumentality which produces a uniform result in respect to removing limited portions of the crop along with the leaf appendages thereof.

It is highly desirable to provide for adjustments in harvesting instrumentalities so that a wide range of effective variances is had in the positions of the several elements connected therewith. This is in order that the harvester may be made effective with respect to normal crops and also with respect to abnormal growths or conditions. Such adjustments are necessary in order to harvest varying crops without injury thereto. Compensating adjustments are highly desirable when the direction and magnitude of the growth of a crop and the ease of its removal from the ground are highly variable factors. It is believed that the present apparatus fully compensates for these factors.

Included in the objects of the invention, among others, are the following:

An improved means for imparting a gradual lift and a concurrent pull upon a soil embodied crop to effect its removal from such soil.

An improved means for conjointly lifting and pulling a soil embodied crop from the soil.

An improved means for conveying a crop along a predetermined path along which the apparatus has instrumentalities for severing parts of the harvested crop.

A new and improved means for determining the point at which a harvested article shall be acted upon by severing instrumentalities.

Novel means for harvesting a crop, like sugar beets, and conveying such crop past cutters whereby a selected portion of the beets and the appendages of such beets are removed therefrom.

Novel means for regulating the position of a beet, or other object, as it approaches cutting members or other instrumentalities.

Means for separating the appendages from the root portion of a crop.

The combination of elevating means with guide means for determining the position which a crop will occupy when engaging severing means.

These objects and such other objects of the invention are obtained by the novel construction, improved arrangement, and unique combination of the several elements of the present invention illustrated in the accompanying drawings, hereby made a part of this specification, and in which:—

Like reference characters are used to designate similar parts in the drawings and in the description of the invention hereinafter given.

For convenience of description and full understanding, the machine may be divided roughly into several units as for example, its frame, its transmission, the pullers, the cutting mechanism, and the elevating mechanism. These will each be separately described.

The frame construction

Figure 1:
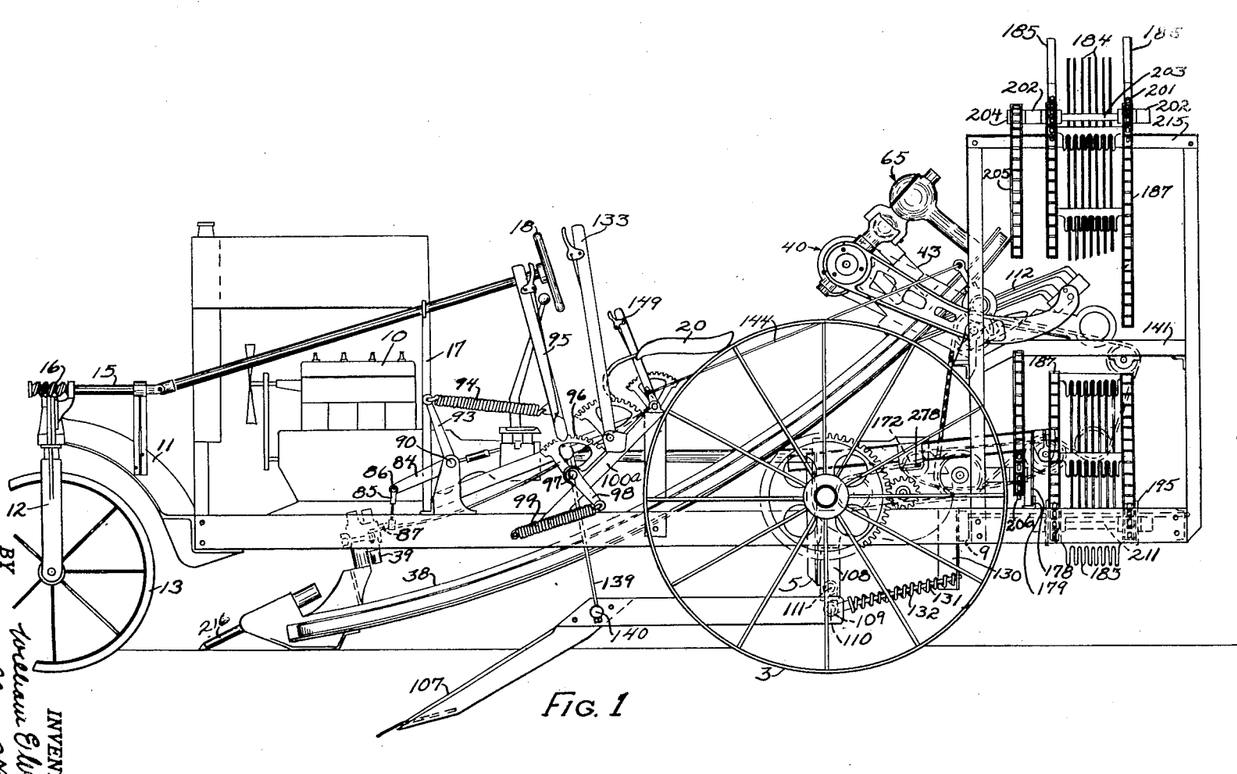
Figure 1 is a side elevation of the harvesting machine embodying the subject matter of the present invention.
Figure 2:
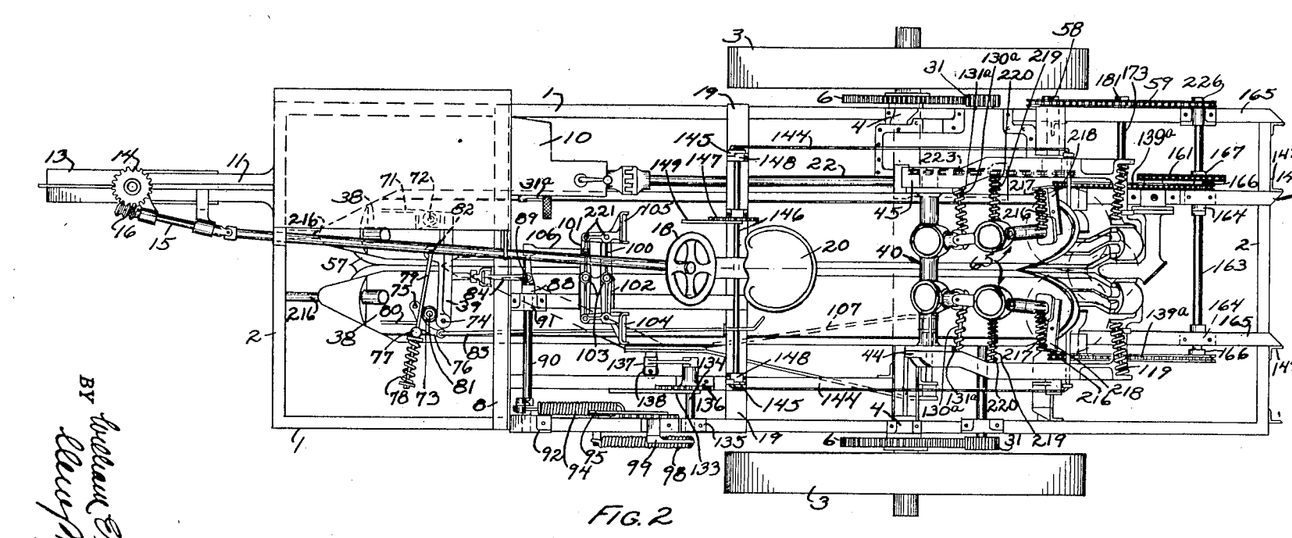
Figure 2 is a plan view of the harvesting device shown in Figure 1.

For the details of the frame structure, reference should be had primarily to Figures 1 and 2, which figures may be conveniently read conjointly. A main frame for the apparatus may comprise two or more longitudinally disposed parallel main frame members 1 secured together by a plurality of transverse frame members such as members 2. In the present instance, two members 2 are employed in conjunction with other transverse members to assist in maintaining the frame members 1 in parallelism.

At each side of the main frame are bull wheels 3 (see Figures 2 and 3), which support the frame above the ground. The bull wheels 3 are secured to the projecting hubs of ring gears 6 which gears 6 are rotatably mounted upon stub axles 4 secured to the longitudinal main frame members 1.

In juxtaposition to the forward transverse member 2, and between member 5 and rear member 2, are other transverse frame members 8 and 9. Between the forward transverse member 2 and transverse member 8 and at the right hand side of the machine (Figure 1) is any conventional form of suitable internal combustion engine designated 10. The engine constitutes a prime mover for driving the harvester and its many parts.

In a supporting bracket 11 secured to member 2 at the forward end of the machine is a fork 12 and within the fork is disposed a front or guide wheel 13. Said wheel is freely rotatable in fork 12, and said fork 12 is mounted for free rotation in the bracket 11.

Upon the fork 12 is a gear 14. For the purpose of rotating such gear, which actuates the fork 12, there is a steering rod 15 and a worm 16 meshing with said gear. Rotation of the steering rod 15 which is mounted in suitable brackets disposed upon the supporting bracket 11 and the vertical member 17 is accomplished by means of steering wheel 18.

In juxtaposition to the steering wheel 18 and mounted on transverse member 19 is a driver's seat 20 which may be of any suitable configuration and style.

In operation, an operator seated in the seat 20 is adapted not only to control the speed of the engine 10 and the bull wheels 3, but the operator also controls the course of the harvester by adjustment of the steering fork 12 through the steering wheel 13, rod 15, and gears 14 and 16.

The transmission

Figures 3, 4, 5:
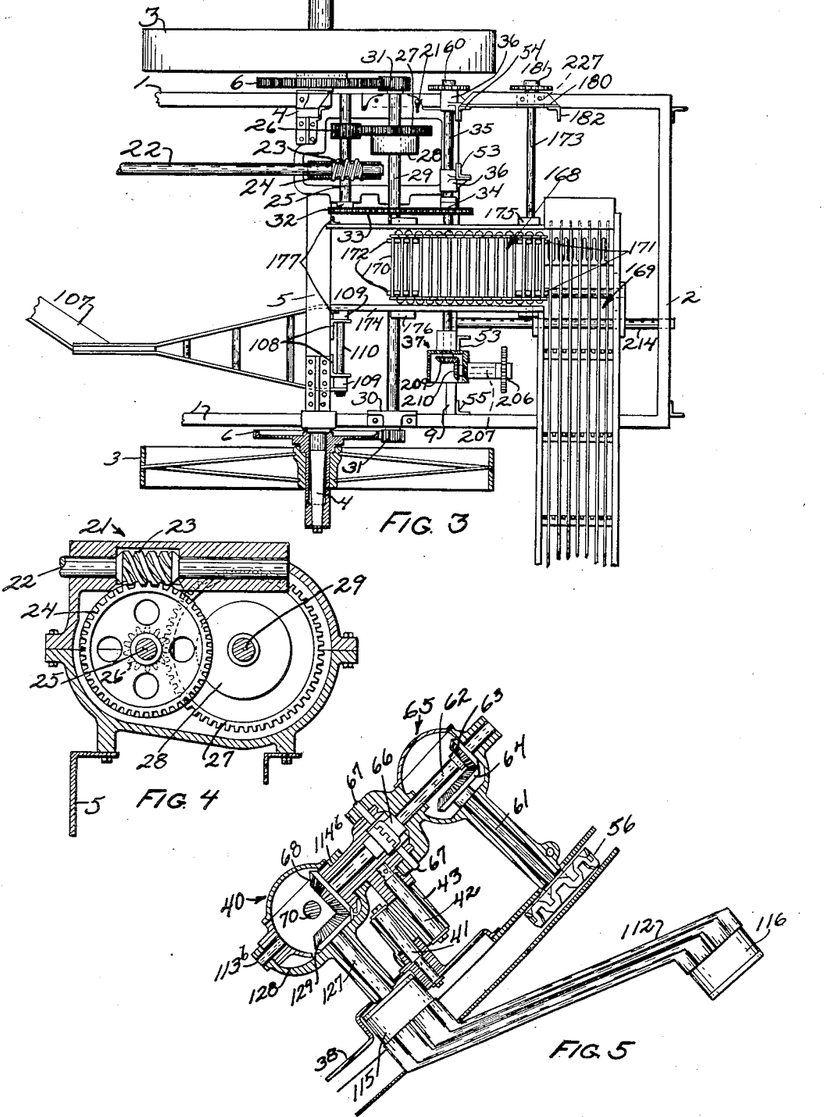
Figure 3 is a plan view of the rear end of the machine with the puller and cutting mechanisms removed.
Figure 4 is a sectional side view of the power transmitting mechanism.
Figure 5 is a sectional view of the puller and roller bar driving mechanism.

Extending rearwardly from engine 10 and to transmission housing 21, Figures 3 and 4, and running in suitable bearings is a clutch shaft 22. Keyed to shaft 22 is a worm 23 in meshing relation with a worm gear 24 which is secured upon transverse shaft 25 which rides in suitable bearings provided therefor in housing 21.

A pinion 26 is secured upon shaft 25 and drives ring gear 27 which is mounted upon a conventional form of differential designated generally 28. Differential 28 is in turn secured in a conventional manner upon a transverse shaft 29, which is journalled at one end in housing 21 and the other end in bearing 30. Secured at each end of transverse shaft 29 are pinions 31 which drive ring gear 6 rotatably mounted upon axles 4, and to which are secured bull wheels 3 as heretofore described.

A clutch mechanism upon the engine 10 is controlled from the operator's seat 20 by a conventional clutch controlling pedal 31a. It is in this manner that the engine 10 is coupled to drive bull wheels 3 to give tractive effort to the harvester.

Also secured upon transverse shaft 25 is a chain sprocket 32 (Figure 3) which drives chain 33. Chain 33 rotates about sprocket 34 which is secured upon shaft 35 transversely arranged in respect to main frame member 1 and journalled in bearings 36 and housing 37.

The puller mechanism

Midway between the two longitudinal main frame members 1 are disposed, paired, and oppositely arranged puller frames 38 plainly shown in Figure 2. At their forward end, the puller frames 38 are held in spaced relation by arch bracket 39.

Figure 6:
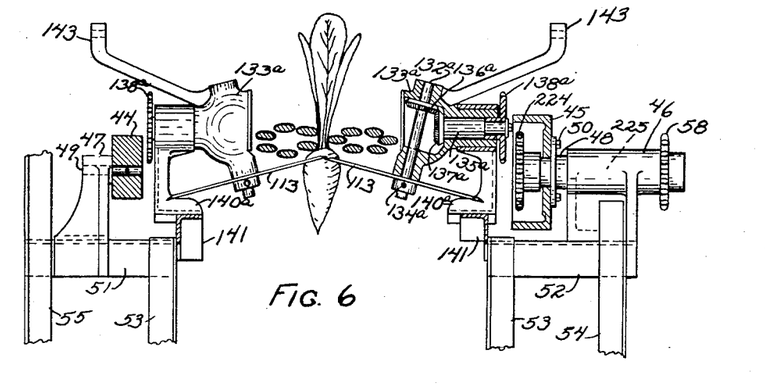
Figure 6 is a rear view of the first two circular cutters illustrating their operation upon a crop.

The rear ends of puller frames 38 are secured to a housing 40 by means of shouldered pins 41 and 42 and link member 43, (Figure 5). Secured to the housing 40 are supporting members 44 and 45 (Figure 2). Supporting member 44 is pivotally connected to bracket 47 by means of pin 49, (Figure 6). Supporting member 45 is pivotally connected to bracket 46 by means of projecting bearing 48 secured to said member 45 by means of bolts 50.

Bracket 46 is secured to a short transverse member 52 which in turn is secured to two vertical supporting members 53 and 54. Bracket 47 is secured to short transverse member 51 which in turn is secured to vertical supporting members 53 and 55. The vertical supporting members 53, 54 and 55 are secured in a conventional manner to the transverse frame member 9.

By pivotally connecting puller frames 38 to housing 40 by means of link member 43 and shouldered pins 41 and 42 (Figure 5), the puller frames may be guided transversely in keeping with irregularities in the row of a crop, thus compensating for the physical inability of an operator to drive the machine, as a whole, with a sufficient degree of accuracy to provide for exact registration at all times with a crop.

About driving sprockets 56, (Figure 5), and similarly driven sprockets in the forward ends of the puller frames 38 a stalk puller chain or conveyor 57 moves. Said chain comprises a rubber or elastic part and includes chain links which rotate upon sprockets 56 and similarly driven sprockets in the forward ends of puller frames 38 and upon which the rubber or elastic parts are seated.

A full and complete description and illustration of the driving sprockets 56, and the carrier 57 for gripping the tops of the crops, is to be found in the copending application of William E. Urschel, the applicant here, Serial Number 342,032, filed February 23, 1929, entitled "Bean harvester", and in other applications for Letters Patent in the name of the present applicant.

A full and complete description and illustration of the puller frame 38 is to be found in Letters Patent Number 1,894,802, to William E. Urschel, issued January 17, 1933, entitled "Beet harvester". Reference should also be had to Letters Patent Number 1,874,837, to William E. Urschel, dated August 30, 1932, entitled "Beet harvester".

In view of this previous complete disclosure of the character of stalk puller chain and puller frames 38 here employed, the present drawings do not illustrate in such great detail the structural features of the puller chain 57 and puller frames 38.

Chain sprocket 56 is secured to shaft 61 (Figure 5) which is driven by shaft 62, the intermediate gears being designated by the numerals 63 and 64. In order to permit sprockets 56 to spring apart when the amount of stalk between the chains 57 varies, housing 65 is pivotally secured to housing 40 by means of pins 67.

Figure 11:
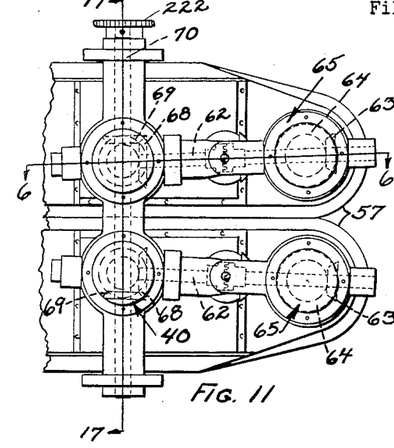
Figure 11 is a plan view of the puller and roller bar driving mechanism.

For the same reasons, flexible couplings 66 have been inserted in shafts 62. Shaft 62 is driven by shaft 70 (Figure 11), the intermediate gears being designated by the numerals 68 and 69. Secured upon the right hand end of shaft 70 is a chain sprocket 222 (Figure 11) driven by chain 223 (Figure 2). Chain 223 is driven by sprocket 224 (Figure 6), secured to shaft 225 journalled in projecting bearing 48. Secured to the other end of shaft 225 is a chain sprocket 58 driven by chain 59.

Chain 59 is driven by sprocket 60 secured upon one end of shaft 35 (Figure 3), heretofore described. Sprockets 56 (Figure 5) are held in position by means of reciprocating spring rods 216 (Figure 2) pivotally secured to housing 65 and reciprocally mounted upon bracket 218, secured to puller frames 38. Springs 217 are mounted upon rods 216 in a manner to create a resilient tension upon housings 65.

The rear ends of puller frames 38 are held in spaced relation by means of reciprocating spring rods 219 (Figure 2) pivotally secured to puller frames 38 and reciprocally mounted upon supporting members 44 and 45. The spring 220 mounted upon rods 219 creates a resilient tension upon said puller frames 38 to permit foreign objects to pass between said frames without causing injury thereto.

As previously stated, the forward ends of puller frames 38 are held in spaced relation by means of arched brackets 39 (Figure 2). The right hand end of arched bracket 39 is pivotally mounted upon bracket 71 by means of pin 72. Bracket 71 is secured to the right puller frame 38 in a conventional manner.

The left end of arched bracket 39 is rotatably mounted upon link member 73 by means of pin 81. Link member 73 is rotatably mounted upon the vertical pin 81 projecting from bracket 80. Bracket 80 is secured to the forward end of the left puller frame 38.

Link 76 is hinged to link member 73 by means of a pin 75. Mounted upon said link 76 is a stud 77 secured in any conventional manner to allow rotatable movement. Reciprocally mounted in member 77 is a spring rod 79 pivotally secured at one end to arch bracket 39 at point 82 (Figure 2).

Mounted on the other end of said reciprocating rod 79, is spring 78. In event a small stone or some other small incompressible foreign object is lodged in between the puller frames 38, i. e., between chains 57, spring 78 will be compressed thus allowing the arched bracket 39 to cause link member 73 to rotate about pin 81. The above stated action increases the distance between pins 72 and 81 thus permitting the puller frames 38 to spread apart and allow the incompressible material to pass through.

The operator may decrease the tension on spring 78 by moving rod 83 which is pivotally connected to link member 76 forward. Such forward movement of rod 83 causes link 76 to hinge about pin 75 secured in member 73. Such action also causes pin 74 to move toward the right (Figure 2) thus forcing puller frames 38 apart.

By reference to Figure 1, it will be noted that the puller frames 38 are supported at their front end by a bevel crank 84, the latter being secured to an extended pivot pin 87 by a connecting rod 85. Connecting rod 85 is secured to said bevel crank 84 by a pin 86. Connecting rod 85 is secured to said extended pivot pin 87 by means of a ball and socket joint. Bevel crank 84 is secured within clevis 88 by means of pin 89, the latter being of such construction as to allow a transverse movement of the puller frames 38 when they are being guided along a row of crop.

Said clevis 88 is secured to a shaft 90 which is rotatably mounted in brackets 91 and 92, said brackets being secured to the transverse frame member 8. Also secured upon shaft 90 (Figure 1) is an arm 93 which in turn is connected to lever arm 95 by means of spring 94. Spring 94 is so mounted that it exerts a resilient tension upon arm 93 to urge the puller frames 38 into an adjusted position, but permits said puller frames 38 to slide over obstructions and uneven ground.

The spring 94 compensates for the changes in the position of said puller frames. Hand lever 95 is secured to shaft 97 (Figure 1) said shaft 97 being rotatably mounted in bracket 96, which is secured to member 100a. The said member 100a is secured in any conventional manner to longitudinal main frame member 1 and transverse support member 19 which in turn is also secured to longitudinal main frame members 1. Another lever 98 is mounted on the other end of shaft 97. Attached to said lever 98 is a spring 99 which is secured to longitudinal main frame member 1.

Said spring 99 exerts a tension upon lever 98 creating a counterbalancing force to that exerted by the weight of puller frames 38. The above mentioned action of spring 99 upon lever 98, renders the adjustment of the height of puller frames 38 by means of hand lever 95 a comparatively easy operation.

In order that the puller frames may register with a row of a crop, means for shifting the puller frames transversely of the machine frame, to guide them, are provided. This is done by foot levers 100 and 101 (Figure 2) pivoted to a bracket 102 by means of pins 103. Foot rests 104 and 105 are mounted on the foot levers 100 and 101 by studs 221 secured in said foot levers 100 and 101. Foot lever 101 is joined to a bevel crank lever 84 by a rod 106. By using the two said foot levers, the foot rests 104 and 105 are at all times in transverse position with respect to the machine.

A lifter or ground breaking means, 107 (Figure 1) is mounted under the puller frames 38 to assist in elevating the crop. By the arrangement herein illustrated, i. e., positioning the lifter 107 in juxtaposition and beneath the lifter frames 38, as shown, the crops are actually elevated by the breaking of the ground therebeneath by the lifter 107, the puller chains 57 making the elevation obtained by the breaking of the ground a truly vertical elevation, and permitting of the additional elevation obtained through said chains 57 a relatively simple matter without burdening chains 57 with a pull upon the crops to dislodge them from the ground.

The said lifter 107 is pivotally connected to brackets 108 by means of links 109 secured to said lifter 107 by pin 110, and brackets 108 by pins 111.

The brackets 108 are secured in any conventional manner to heretofore described transverse frame member 5 (Figure 3). In case lifter 107 strikes an obstruction, the reciprocating spring rod 131 resiliently mounted in bracket 130 and pivotally mounted upon pin 110 at its other end absorbs the shock by means of the cushioning effect of spring 132 mounted upon said reciprocating rod 131.

Bracket 130 is secured to heretofore described transverse member 9. Such method of securing said lifter 107 to the main frame of the machine, prevents damage to said part of machine, and also prevents such damage as would result from the machine becoming lodged against movement in accordance with the demands of the traction applied thereto.

The lifter or plow 107 may be controlled from the operator's seat 20 by means of hand lever 133 (Figure 1). Hand lever 133 is secured to the short transverse shaft 134 (Figure 2) journalled at one end in bracket 135 and at the other end in bracket 136. Secured to the right hand end of said shaft is lever arm 137 in which is rotatably mounted a stud 138. Reciprocally mounted in said stud is a rod 139 pivotally secured to lifter 107 by means of stud 140, thus forming a connection between hand lever 133 and lifter 107.

The gaging cutting mechanism

Figures 17, 19, 20:
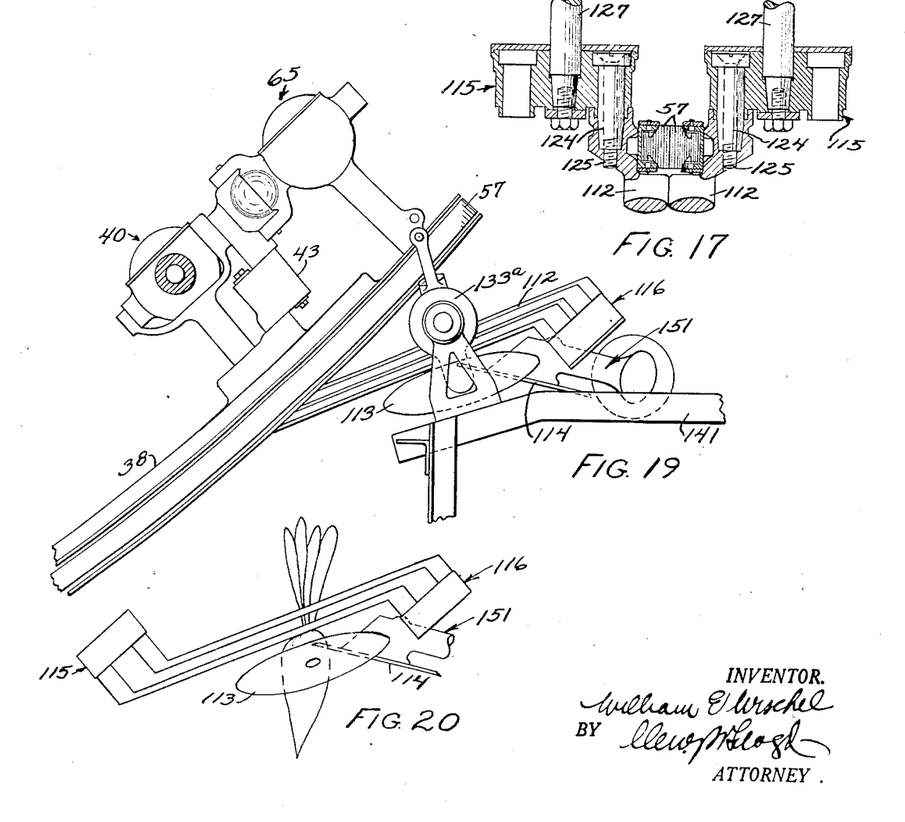
Figure 17 is a sectional view of the forward roller bar hubs taken on line 17—17 of Figure 11 in the direction indicated by the arrows.
Figure 19 is a side view of puller and roller bar drive and cutting mechanism.
Figure 20 is a diagrammatic side view illustrating the action of the cutting knives on the crop.
Figure 18:
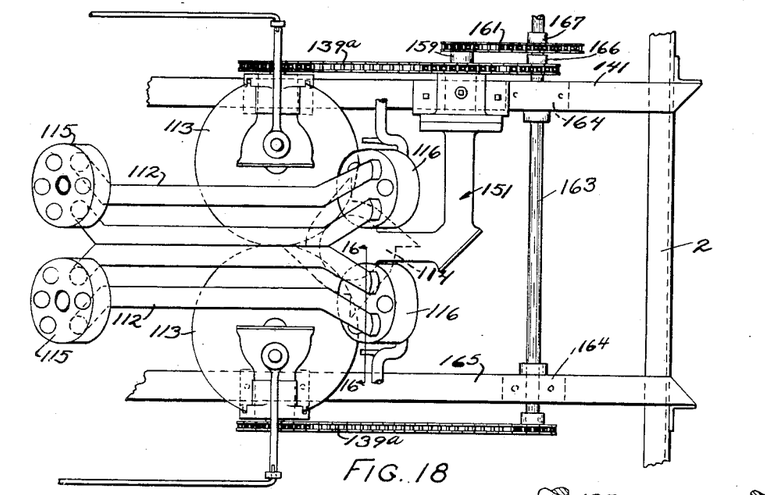
Figure 18 is a plan view of roller bars and cutting mechanism.

The mechanism employed to remove tops of the crop with the appendages depending therefrom comprises primarily two sets of opposed and moving rods 112, two oppositely disposed cutting discs 113, and a third circular cutter 114 (see Figures 18, 19 and 20). The crop adjusting means or roller bars 112 are disposed in the path of a crop being elevated and conveyed by the arcuate carriers 57.

By reference to Figure 17, it will be clear that the forward ends of the said roller bars 112 press against the links of chains 57 serving as a guide and holding said chains in contiguous relation. This facilitates the transfer of the appendages of the crop from the puller chains 57 to engagement with roller bars 112 by creating a colineal path for the crop. The said roller bars 112 press against the lower side of the resilient section of chains 57, thus forming a continuous path without any gaps or irregularities for the appendages to traverse. These said complemental roller bars 112 arranged in series operate so that the appendages of the crop are drawn between the two sets of oppositely disposed roller bars, the crops being drawn upwardly within certain limitations by the action of such roller bars (see Figures 6 and 7).

Figure 16:
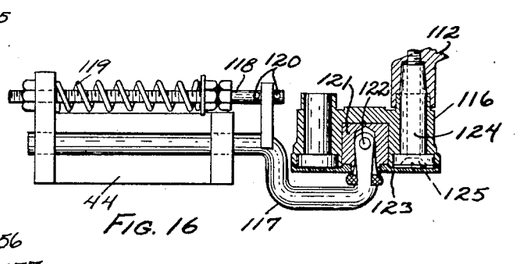
Figure 16 is a rear view of the rear roller bar support and a sectional view of the rear roller bar hub taken on the line 16—16 of Figure 18 looking in the direction of the arrows.

The roller bars 112 of each section of the device are secured at the rear end by cylindrical bearing blocks 116 and at the forward end by means of cylindrical bearing blocks 115 (see Figures 16 and 17). The said roller bars 112 can be clearly seen in Figures 5 and 18. Although the path of the said roller bars 112 describes a circular course about a common axis, each roller bar itself does not make a complete rotation about its individual axis, producing an action similar to the motion of the carriages in a common type of amusement in the form of a "Ferris" wheel.

In addition to producing longitudinal or upward movement of the crop, the said roller bars 112 also produce a transverse action to the crop held between the two sets of roller-bars thus conveying the crop rearwardly to the cutting mechanism.

At the forward end of said roller bars 112, as is clearly shown in Figure 17, there are extended bearing pins 124 secured to said roller bars by means of machine screws 125. These bearing pins are journalled in cylindrical bearings 115.

The said bearings 115 are keyed to shafts 127 journalled in bracket 128 (Figure 5). Keyed to the other end of shafts 127 are gears 129 in meshing relation with heretofore described gears 68 furnishing the motive power for the said roller bars 112.

The brackets 128 are pivotally mounted upon housing 40 by means of pin 113b and a bearing bracket 114b. Reciprocally mounted on brackets 44 and 45 (Figure 2) are spring rods 130a pivotally secured to brackets 128. A resilient tension is exerted upon spring rods 130a by the springs 131a. This action allows the lower end of brackets 128 to move transversely, compensating for the change in bulk of the crop passing through the crop positioning means moving longitudinally and transversely of the crop or to prevent hard foreign materials from damaging said positioning means.

Extending bearing pins 124 journalled in cylindrical bearings 116 (Figure 16) are secured to the rear end of roller bars 112 by means of machine screws 125. Cylindrical bearings 116 are rotatably mounted upon bearing members 121 which in turn are pivotally mounted upon reciprocating arms 117 by means of pins 122. The said arms 117 are reciprocally mounted in brackets 44 and 45.

Springs 119 (see Figure 16) are resiliently mounted upon spring rods 118 which in turn are secured to arms 117 by pins 120 and reciprocably mounted in brackets 44 and 45 at their other end. The resilient tension of springs 119 upon arms 117 allows the rear ends of the two sets of guide members 112 arranged in opposed series to move transversely to compensate for any change in bulk of crop passing through the sets of roller bars or to prevent any hard foreign material from causing injury to said roller bars by becoming wedged between the two series of said roller bars.

The two sets of roller bars 112 heretofore described are oppositely and complementally disposed. The two sets of bars rotate about different axes in opposite directions in a manner heretofore described. It is the purpose of said bars 112 to engage the appendages of a crop, to pull such appendages upwardly between the two sets of roller bars, and to draw the root portion of the crop into close proximity with the lowermost sections of the contiguous roller bars.

As there is a constant pulling effect upon the crop appendages by the bars 112, which pulling effect is insufficient to break the apendages from the root, all of the root crop will be drawn upwardly so that, as it travels toward the rear of the machine, under the influence of chains 57, the root portion will be held with its top face in a fixed plane. While so held, the cutting instrumentality hereinafter described will operate upon the root in a plane beneath such fixed plane.

*The cutting mechanism*

The appendages are removed by means of a pair of oppositely disposed circular cutters 113 and a third circular cutter 114, mounted directly in the path of the crop (see Figures 6, 18, 19 and 20). The path referred to is the path which the crop assumes when being held between the two sets of roller bars 112, and as it approaches the end of the sets of roller bars, the crop being under the influence of the puller mechanisms 38 until the end of the latter is reached. The oppositely disposed circular cutters 113 (Figure 6) are keyed to shafts 132a journalled in housings 133a. The positions of said cutters 113 on shafts 132a are adjustable by means of set screws 134a. Shafts 132a are driven by shafts 135a also journalled in housings 133a by means of intermediate gears 136a and 137a. Secured to shafts 135a are chain sprockets 138a driven by chain 139a (Figure 18) hereinafter described. The housings 133a are rotatively mounted in brackets 140a secured to longitudinal members 141 (Figure 19).

The forward ends of members 141 are fastened to heretofore described vertical members 53 (Figure 6). The opposite ends are secured to vertical members 142 (Figure 2) attached in turn to rear transverse main frame member 2.

Pivotally connected to arms 143 integral with housings 133a and extending forward to the driver's seat are rods 144 (Figures 1 and 2). The forward ends of said rods 144 are pivotally connected to levers 145 secured to transverse shaft 146 journalled in brackets 147 and 148 (Figure 2).

Secured to said shaft 146 is a hand lever 149 controlled from the operator's seat. The position of hand lever 149 controls the angular position of the two oppositely disposed cutter blades 113.

Figure 15:
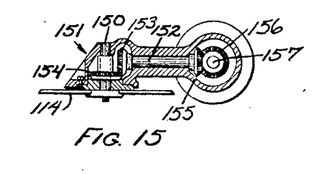
Figure 15 is a sectional view of the third knife taken on line 15—15 of Figure 14 looking in the direction indicated by the arrows.

The third circular cutter 114 is keyed to shaft 150 (Figure 15) journalled in housing 151. Shaft 150 is driven by shaft 152, also journalled in housing 151, by means of intermediate gears 153 and 154. Shaft 152 is in turn driven by shaft 157, also journalled in housing 151 by means of intermediate gears 155 and 156.

Figure 14:
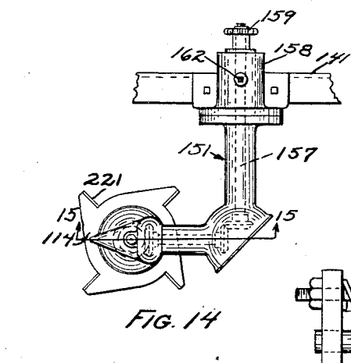
Figure 14 is a plan view of the third knife drive.

Chain sprocket 159 is secured to shaft 157 and is driven by means of chain 161 (Figure 18) hereinafter described. Housing 151 (Figure 14) is rotatably mounted in bracket 158 secured to longitudinal member 141 heretofore described. The angle that the cutter 114 forms with the horizontal plane of the machine may be adjusted by means of set screw 162 in bracket 158.

Shaft 163 (Figures 18 and 2) is journaled in brackets 164 secured to longitudinal members 141 and 165. A chain sprocket 226 driven by chain 59 heretofore described is secured to the right end of shaft 163. Chain sprockets 166 and 167 are also secured to shaft 163 and drive heretofore described chains 139a and 161 respectively.

*Elevating mechanism*

When the upper portion of the crop is sheared or otherwise severed by the cutting means of the machine, the root portion of the root crop falls on to conveyor 168 (Figure 3) and is transported rearwardly by said conveyor and deposited in an elevator 169.

The said elevator carries the severed crop upwardly and transversely and deposits the severed crop in a wagon or any other conventional transport moving in parallelism with the harvester and in the direction of the harvesting machine's travel.

Conveyor 168 is made up of an endless chain 170 composed of a series of parallel interlocked bars (Figure 3) driven by sprockets 171 and idling on sprockets 172. In parallelism with said chain 170 are two side members 174 supported at the forward end by means of vertical members 177 secured to the transverse main frame member 5 (Figure 3).

The rear ends of side members 174 are supported by means of vertical members 178 (Figure 1) secured to transverse member 179. Transverse member 179 is secured to main longitudinal frame members 1. The idler sprockets 172 are secured to shaft 278 (Figure 1).

The shaft 278 is secured in brackets 176 in such a manner as to render it possible to control the amount of tension in the heretofore described conveyor chain 170. Shaft 173 is journalled in brackets 175 and 227 secured to side members 174 and longitudinal supporting member 180. Sprocket 181 is secured to the right end of shaft 173 and is driven by heretofore mentioned chain 59 (Figure 2) providing a means for driving conveyor 168. Longitudinal supporting member 180 is secured to the heretofore described vertical member 54 and vertical member 182 (Figure 3) which in turn is secured to the right longitudinal main frame member 1.

Elevator 169 (Figures 12 and 13) consists of two retaining side members 185 at the base of which are secured rods 184 spaced at regular intervals transversely and longitudinally in parallelism with said side retaining members 185. Directly beneath and contiguous to the rods 184 are fingerlike slats secured to endless chains 187 which impel said fingerlike slats 183 causing them to discharge any crop that might be deposited in said elevator 169.

This type of construction does away with the disadvantages of the common type of elevators consisting of slats connected to chains, in which the roots of the crop have a tendency to become entwined in said slats and chain causing said crop to be carried back beneath the conveyor.

Figure 12:
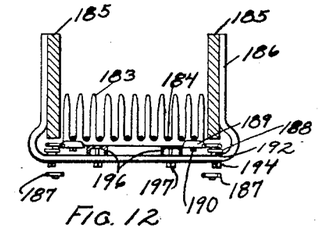
Figure 12 is a sectional view of the crop elevator taken on the line 12—12 of Figure 13 looking in the direction of the arrows.
Figure 13:
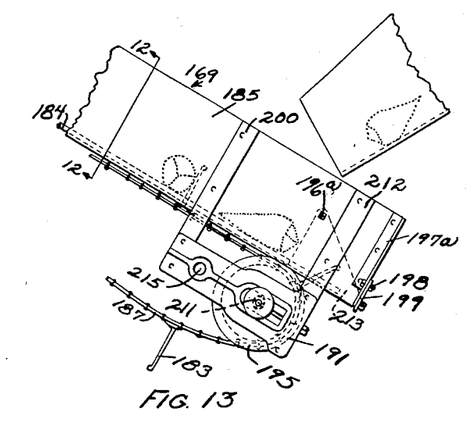
Figure 13 is a rear view of the lower end of the crop elevator.

Side members 185 are held in parallelism at a fixed distance apart by means of spacing members 186 (Figure 12). The finger-like slat members 183 are secured to links 189 in chains 187 by means of bolts 190. Said slats slide on supporting channel members 196 secured to members 186 by means of bolts 197, said members being longitudinally in parallelism with members 185. Chains 187 are supported by strap supporting members 188 which are also longitudinally in parallelism with members 185.

Members 188 are secured to members 186 by means of bolts 194 and held at a fixed position therefrom by means of spacers 192. The chains 187 are driven by sprockets 201 (Figure 1) and idle upon idler rolls 195. The sprockets 201 (Figure 1) are secured to shaft 203 journalled in brackets 202 which in turn are secured to side retaining members 185.

Keyed to one end of shaft 203 is a sprocket 204 driven by means of chain 205. The said chain 205 is driven by sprocket 206 secured to a shaft 207 (Figure 3). Shaft 207 is journalled in housing 37 and is driven by the heretofore described shaft 35 by means of intermediate gears 209 and 210, thus providing means for driving said elevator 169. The idler rolls 195 (Figure 13) run freely upon shaft 211 (Figure 1) which is secured to brackets 191 provided with a suitable takeup for the chains 187.

The brackets 191 are secured to side members 185 by means of strap members 200 and 212. Rods 184 are held in position by members 213 secured to said rods 184 in any conventional manner. The said members 213 are regularly spaced by means of a slotted retaining member 199 secured to brackets 197a by bolts 198.

Brackets 197a are fastened to side members 185. Members 213 are also secured to side member 185 by means of bolt 196a upon which are also mounted spacing washers (not illustrated) for the purpose of keeping members 213 regularly spaced to allow fingerlike slats 183 to pass between said members 213 freely.

The said elevator 169 is secured to the main frame of the machine by means of shaft 214 which is fitted into opening 215 in brackets 191 in such a manner as to facilitate easy removal of said shaft 214. Shaft 214 is secured to transverse frame member 9 and rear transverse main frame member 2 in the manner heretofore described. The degree of inclination of said elevator 169 is regulated by means of supporting chains (not illustrated) secured at one end to side members 185 and at the other in openings in longitudinal supporting bracket 215.

General operation

With the arrangement of the parts heretofore described, it will at once be apparent that a machine has been provided with elevating means for said embedded crops having leaf appendages, said elevating means adapted to gradually elevate such crops along a predetermined path to effect the removal thereof from the soil and to sever the appendages therefrom.

Figures 7, 8, 9, 10:
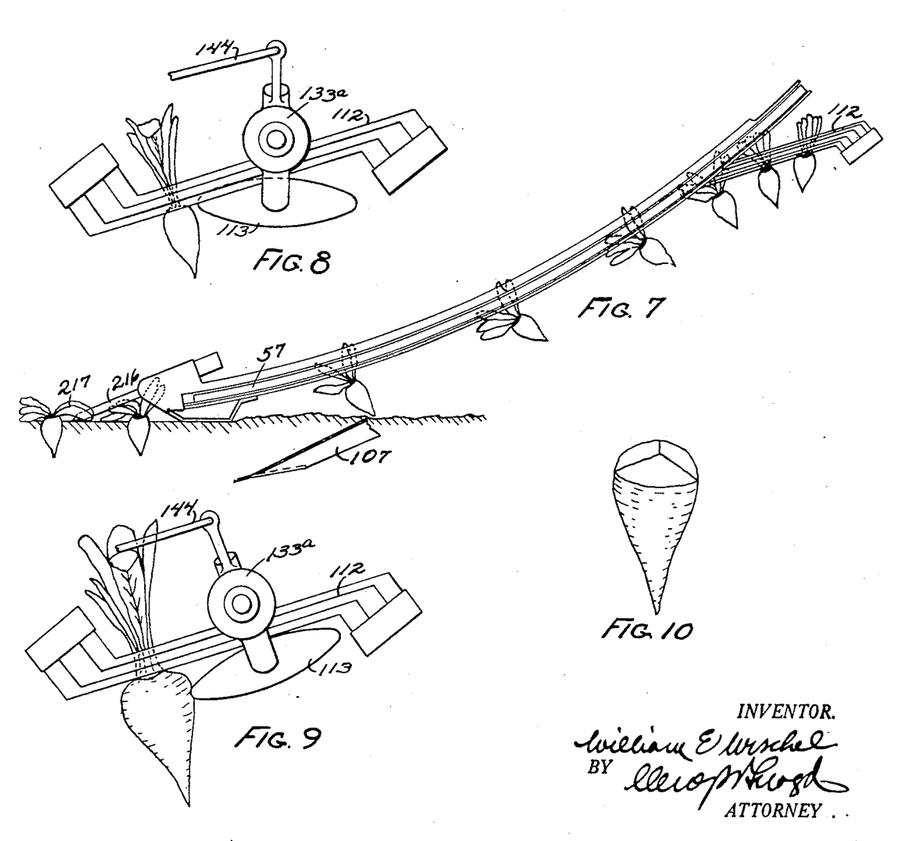
Figure 7 is a diagrammatic side view of the puller and roller bar mechanism showing the movement of a beet from its position in the soil to the final position it takes when ready to be acted upon by the cutting mechanism.
Figure 8 illustrates the angle of the side cutting knives set to cut small crops.
Figure 9 illustrates the angle of the side cutting knives set when arranged to cut large crops.
Figure 10 is a perspective of beet after it has passed through the cutting mechanism.

The soil elevator 107 assists the chains 57 in taking the crops from the soil. Figure 7 illustrates diagrammatically the path of the crop from the soil to the engaging means intermediate knives and cutters where it is prepared to be acted upon by the cutting instrumentalities. The diagram illustrates the point that it is not necessary for the said puller chains to grasp the entire stalk of the crop in order to present the crop to the cutting instrumentalities in fixed manner.

As the machine moves forwardly the projecting pin 216 slips beneath leaves 217, the inclined position of said pin causes said leaves 217 to raise into a position to be favorably grasped by the puller chains 57. The root crop is then removed from the soil by means of said puller chains 57 aided by soil elevating plow 107, and conveyed and elevated rearwardly along an arcuate path to the roller bars 112.

The roller bars engage with the crop appendages and draw the crop upwardly until the top portion of the crop comes in contact with the roller bars when the crop cannot be drawn up through the roller bars and continues in its path toward the cutting instrumentalities. This causes the crop to approach said cutters with the root tops all in the same plane rendering it a comparatively simple operation to sever a predetermined portion of the said tops.

As the crop is carried rearwardly by the roller bars, it is carried through the abutting edges of two oppositely disposed cutters 113 positioned as shown in Figure 6. At the same time a third cutter 114 which is shown diagrammatically in Figure 20 also severs the top so that the root of the crop after passing through said cutter assumes the form of crop shown in Figure 10.

In Figure 7, it will be seen that the crop approaches the cutters suspended from the roller bars 112 at a slight angle to the vertical plane of said cutters. Therefore, the cuts made by the first two cutters 113 will be slightly inclined toward the point where the crop first came into engagement with said cutters. This upper portion of the crop is severed by means of the third cutter 114. By referring to Figure 14, it can be clearly seen that due to the form of the cutter 114, the amount of the top severed by said cutter 114 is fixed by the length of the cutting edges 221.

The angle at which the oppositely disposed cutters come in contact with the root crop may be changed to accommodate different sizes of crop, thereby governing the amount of top to be severed from the root. Figure 8 illustrates the position of cutters for small crops and Figure 9 for large crops. The position of said cutters may be controlled from the operator's seat by means of rod 144 (Figures 8 and 9).

The severed root crop is then dropped upon conveyor 168 (Figure 3). The said conveyor contains a chain made up of parallel interlocked bars of such construction as to allow the soil that might be clinging to the root crop to separate therefrom and fall upon the ground beneath. The crop travels rearwardly upon said conveyor and is deposited into elevator 169.

Elevator 169 is also of such construction as to allow soil or any foreign material to separate from the root crop. The said elevator deposits the root crop into a wagon or receptacle alongside the said harvesting machine. The foliage of the crop is discharged at the rear end of the roller bars and beyond conveyor 168 or elevator 169, being held by the roller bars and conveyed to a point further to the rear, where it may either fall clear of the conveyor or elevator or be shunted clear thereof by an interposed chute which is not a part of the invention or a necessary or permanent part of the machine but which may be and often is used.

To adapt the machine to crops such as the red beet or carrots, when it is desirable to remove the appendages close to the body of the crop, the cutters may be removed. The pressure of the springs 119 and 131 (Figure 1) is then increased to such an extent that the body of the crop will be drawn up against the roller bars and the appendages of the crop will be pinched, crushed, or otherwise severed from the body of the crop. This is possible whenever the appendages are relatively tender and are readily broken from the root.

I claim:—

1. In combination, carrying means, and cutting discs in the path of material in said means, certain of said cutters being disposed in front of another disc for severing a determined portion of the material in said carrying means, and being adjustable independently of said other disc.

2. In combination, carrying means including belts, for moving beets along a predetermined path, and rotary cutting means in the path of a beet in said carrying means with the blades thereof disposed in three planes angular one to another to cut away the leaf end of the beet and leave the beet with a three faced crown the angles of the planes of two of said blades being adjustable independently of the angle of the plane of the third blade.

3. A beet topping device comprising a plurality of disc cutters, and means for changing the planes of rotation of two of said cutting discs independently of a change in plane of rotation of the other for producing pyramids of different heights at the crown of a beet.

4. Means for harvesting soil embodied crops comprising an elevating means gripping the top of a crop, a ground breaking means operable upon the soil about the said crop after the engagement of said crop by said elevating means, crop positioning means moving longitudinally of the crop and intermediate said elevating means and cutters, cutting means comprising oppositely disposed rotary cutters, a third cutter positioned rearwardly of and beneath said first mentioned cutters and cooperating with said first mentioned cutters to produce a three plane cut on the top of the crop, and means for moving the said several cutters relatively to the crop positioning means.

5. Root crop cutting means comprising oppositely disposed rotary cutters adapted to sever a portion of the top part of a root crop, in combination with a third cutter removed from said oppositely disposed rotary cutters and adapted to sever the remaining portion of the top part of the crop, the first two said rotary cutters being adjustable independently of the said third cutter.

6. In combination, means for adjusting the top surface of root crops to cutting instrumentalities, a pair of oppositely disposed rotary cutters for removing a portion of the top of the root, a third rotary cutter disposed in the path of the crop for removing the remaining top of the root, and means for moving the rotary cutters relatively to one another and to said adjusting means.

WILLIAM E. URSCHEL.